United States Patent
Yamashita et al.

(10) Patent No.: US 6,516,378 B1
(45) Date of Patent: Feb. 4, 2003

(54) MICROPROCESSOR FOR CONTROLLING BUSSES

(75) Inventors: Hiroyoshi Yamashita, Kanagawa (JP); Masaaki Tani, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/426,757

(22) Filed: Oct. 26, 1999

(30) Foreign Application Priority Data

Dec. 1, 1998 (JP) .......................................... 10-341205

(51) Int. Cl.$^7$ ............................................... G06F 13/42
(52) U.S. Cl. ...................................... 710/306; 710/240
(58) Field of Search ............................... 710/305–317, 710/240–244

(56) References Cited

U.S. PATENT DOCUMENTS

| | | | | |
|---|---|---|---|---|
| 5,034,881 A | * | 7/1991 | Hoashi et al. ............... | 710/123 |
| 5,034,887 A | * | 7/1991 | Yasui et al. .................. | 711/173 |
| 5,386,537 A | * | 1/1995 | Asano .......................... | 711/103 |
| 5,892,170 A | * | 4/1999 | Ichiki et al. .................. | 84/605 |

FOREIGN PATENT DOCUMENTS

EP         0192578 A2  *  2/1986

* cited by examiner

Primary Examiner—Rupal Dharia
(74) Attorney, Agent, or Firm—Arent Fox Kintner Plotkin & Kahn PLLC

(57) ABSTRACT

The present invention provides a microprocessor capable of improving the throughput of a CPU. Module like the program ROMs in which instruction accesses are concentrated by a CPU are put together in a first Princeton bus, and modules like the external bus I/F, SDRAM I/F, peripheral bus I/F in which data accesses are mainly concentrated are put together in a second Princeton bus. Therefore, the instruction access and the data access can be carried out in parallel with respect to the buses of the instruction bus and the data bus individually through a bus control unit. Because the buses can be used efficiently, the throughput of the CPU can be improved substantially.

13 Claims, 12 Drawing Sheets

MICROPROCESSOR FOR CONTROLLING BUSSES

FIELD OF THE INVENTION

The present invention relates to a microprocessor equipped with a plurality of buses and a plurality of bus masters. More particularly this invention relates to a microprocessor equipped with a bus control unit for efficiently controlling the buses when there are access requests from the bus masters. In a microprocessor used for a control device or a portable electronic apparatus in recent years, there has been generally employed a system having a large number of modules connected on the buses for controlling these modules through the buses in order to achieve complex processes and to enhance expandability of the processing. Particularly, on a microprocessor of which high-speed processing is required, a cache memory and a DMA (Direct Memory Access) controller are mounted to increase the use efficiency of the buses.

BACKGROUND OF THE INVENTION

FIG. 1 is a block diagram which shows a schematic configuration of a conventional microprocessor employing a Harvard architecture. Harvard architecture is one of architectures at a register level, which uses buses for data access (data buses) and buses for instruction access (instruction buses) provided independent of each other. Further in Harvard architecture, a memory connected to the data buses, that is, a data memory, is exclusively used for storing data, and a memory connected to the instruction buses, that is, an instruction memory, is exclusively used for storing instructions. Thus, the data memory and the instruction memory are used as spatially separated addresses. By using this Harvard architecture, the microprocessor can protect instructions and can achieve a parallel operation of accesses, thereby to achieve a high-speed processing.

As shown in FIG. 1, the conventional microprocessor 100 includes a CPU (Central Processing Unit) 110 for executing instructions according to program codes, a bus control unit 120 for carrying out a bus arbitration by monitoring the state of using a plurality of buses, an instruction memory 131 as a memory for exclusively storing instructions, a data memory 132 as a memory for exclusively storing data. Further, the microprocessor 100 includes a program ROM 141 for storing a start instruction set and a basic instruction set, a program RAM 142 for storing a user program. Further, the microprocessor 100 includes a DMA controller 143 for directly exchanging data, that is, a DMA transfer, between modules connected to the buses without passing through the CPU 110 and various memories. Further, the microprocessor 100 includes an external bus I/F 151 for being connected to external units, to carry out a functional expansion or data input to and output from the external units, an SDRAM I/F 152 for making it possible to expand an SDRAM (Synchronous Dynamic Random Access Memory) as an extended memory. Finally, the microprocessor 100 includes a peripheral bus I/F 153 for executing a function as an interface with incorporated peripheral devices.

Instruction bus IB and a data bus DB are provided between the CPU 110 and the bus control unit 120. The program ROM 141, the program RAM 142, the DMA controller 143, the external bus I/F 151, the SDRAM I/F 152 and the peripheral bus I/F 153 are connected to a common bus, that is a Princeton bus, PB monitored by the bus control unit 120.

A timer 161, a UART (Universal Asynchronous Receiver Transmitter) 162 for supporting a serial communication, an analog/digital converter (ADC) 163, and the like are connected to the peripheral bus I/F 153 as incorporated peripheral devices.

The instruction bus IB, the data bus DB and the Princeton bus PB include a data bus for transferring data and an address bus for transferring an address, respectively. Each module (including the CPU 110) connected to each of these buses is provided with a not illustrated control bus for transferring control signals such as a bus use request signal necessary for communicating with the bus control unit 120, a read/write signal, an address strobe signal, a data strobe signal, various acknowledge signals, etc.

In the microprocessor 100 employing the Harvard architecture as shown in FIG. 1, the instruction memory 131 and the data memory 132, in particular, are used as cache memories, to improve throughput. The basic operation of the microprocessor 100 will be explained below.

When the microprocessor 100 is started, a start instruction unit stored in the program ROM 141 is read into the CPU 110 through the Princeton bus PB and the instruction bus IB, and a user program stored in the program RAM 142 is executed when necessary.

In this case, prior to making an access to the program ROM 141 and the program RAM 142, the CPU 110 checks whether a corresponding instruction is stored in the instruction memory 131 or not. When the corresponding instruction is stored (cache hit), the CPU 110 fetches this instruction from the instruction memory 131 and executes this instruction (instruction fetch).

On the other hand, when the corresponding instruction is not stored in the instruction memory 131, the CPU 110 fetches the instruction from the program ROM 141 or the program RAM 142 which is the original access destination, and executes this instruction. At the same time, the CPU 110 stores the fetched instruction in the instruction memory 131. With this arrangement, when it becomes necessary again to execute the instruction once executed by the CPU 110, it is possible to fetch this instruction from the instruction memory 131.

As explained above, when the cache hit has been obtained, the instruction fetch can be executed in a shorter clock cycle than in the case of accessing the program ROM 141 or the program RAM 142. Therefore, a system which can perform processing at a high-speed can be achieved.

Further, when data once fetched from the SDRAM I/F 152 or others is stored in the data memory 132, in a similar manner to the data stored in the instruction memory 131, it becomes possible to obtain a cache hit from the data memory 132 when it is necessary to make a data access to the SDMA I/F 152 or others. Thus, a system which can perform processing at a high-speed can be achieved In this microprocessor 100, not only the CPU 110 but also the DMA controller 143 can become a bus master. Therefore, the CPU 110 needs to obtain a permission for using the instruction bus IB, the data bus DB and the Princeton bus PB from the bus control unit 120 each time when the CPU 110 carries out the above-described instruction fetch or data access.

In other words, in order to make an access to the program ROM 141 or the program RAM 142, the CPU 110 transmits a bus use request signal representing a request for using the Princeton bus PB to the bus control unit 120 through the control bus.

The bus control unit 120 checks whether the Princeton bus PB is being used by other bus master or not. For example, when the DMA controller 143 is using the Princeton bus PB for carrying out a DMA transfer from the SDRAM I/F 152 to the external bus I/F 151, the bus control unit 120 transmits a bus use request signal to the DMA controller 143. Upon receiving this bus use request signal, the DMA controller 143 goes into a hold state immediately after finishing the bus cycle currently under execution, and then transmits a bus abandon signal to the bus control unit 120.

The bus control unit 120 transmits a WAIT signal to the CPU 110 to make the CPU 110 wait during a period from when the DMA controller 143 receives the bus use request signal till when the DMA controller 143 transmits the bus abandon signal. Upon receiving the bus abandon signal from the DMA controller 143, the bus control unit 120 transmits a bus obtaining signal representing an obtaining of a bus right to the CPU 110. When, the CPU 110 obtains the bus right it can make an access to each unit connected to the Princeton bus PB.

Further, when a bus master like the DMA controller 143 other than the CPU 110 wants to use the Princeton bus PB, this bus master also needs to obtain a bus right by transmitting a bus use request signal to the bus control unit 120 in a similar manner as described above.

Thus, in the conventional microprocessor 100 as shown in FIG. 1, the bus control unit 120 is provided to enable each bus master to obtain a bus right from other bus master, thereby to achieve bus arbitration by avoiding collision of access on the buses.

Further, in the conventional microprocessor 100, it is required that the power consumption is low because it is driven by batteries and for heat countermeasures. The operation of the microprocessor or the operation of a part of the modules of the microprocessor can be stopped in order to achieve low power consumption during a period in which these components are unused. For example, there has been proposed a technique for reducing power consumption by holding a clock signal supplied to the CPU 110 and other modules.

More specifically, an operation mode called a stand-by mode is provided to make a not illustrated clock controller to hold the supply of a clock signal. Similarly an instruction called a sleep instruction may be executed, in order to interrupt the supply of a clock to only a targeted module to hold the operation of this module.

However, according to the microprocessor 100, although an attempt has been made to disperse the load of the buses by individually providing the instruction bus IB and the data bus DB, the CPU 110 needs to obtain a bus right for using the Princeton bus PB for making an access to the program ROM 141 or the program RAM 142. Therefore, an efficient bus access has not necessarily been carried out.

For example, when an instruction code is being fetched from the program ROM 141 to the instruction memory 131 through the instruction bus IB and the Princeton bus PB, the CPU 110 makes it possible to fetch data by using the data bus DB. However, in this state, when the CPU wants to fetch the data input from the external bus I/F 151, for example, it is necessary to obtain a bus right for using the Princeton bus PB. As a result, the CPU 110 must wait until the fetching of an instruction code from the program ROM 141 to the instruction memory 131 is finished.

Further, although the DMA controller 143 as a representative bus master other than the CPU 110 is effective in improving the throughput of an internal arithmetic processing of the CPU 110, the DMA controller 143 is made to wait by the WAIT signal until the CPU 110 transmits a bus abandon signal to the bus control unit 120 as described above, when other bus master like the CPU 110 has the bus right for using the Princeton bus PB. Thus, there has been a problem that it takes time for the DMA controller 143 to obtain a bus right.

In the conventional microprocessor, there has also been proposed a system in which a plurality of Princeton buses PBs is provided as common buses, and modules are dispersed to different Princeton buses PBs. However, as this system is not designed by taking into account the Harvard architecture, it has not been possible to substantially improve the bus using efficiency of the CPU 110.

Furthermore, as described above, according to the above-described conventional microprocessor 100, low power consumption is achieved by the clock controller's stand-by operation for holding the supply of a clock signal. However, in order to hold the supply of the clock signal, the CPU 110 needs to operate a control register within the clock controller for carrying out a store operation, and it has been necessary to prepare a minimum program for test operating the holding of the clock signal.

SUMMARY OF THE INVENTION

In the light of the above-described problems, it is an object of the present invention to provide a microprocessor capable of improving the throughput of the CPU by improving the efficiency of using the buses and capable of shifting to a stand-by operation more easily.

According to one of the aspects of the present invention, the modules of the program ROMs and the like in which instruction accesses are concentrated by the CPU are put together in the first Princeton bus, and the modules of the external bus I/F, the SDRAM I/F, the peripheral bus I/F and the like in which mainly data accesses are concentrated are put together in the second Princeton bus. Therefore, it is possible to make the most of the advantages of the configuration employing the Harvard architecture in which the instruction access and data access are carried out by the individual exclusive buses of the instruction bus and the data bus through the bus control unit.

Other objects and features of this invention will become apparent from the following description with reference to the accompanying drawings.

DESCRIPTION OF THE PREFERRED EMBODIMENTS

There will now be explained in detail preferred embodiments of a microprocessor relating to the present invention with reference to the accompanying drawings. It should be noted that the present invention is not limited to these embodiments. At first, the principle of the microprocessor relating to the present invention will be explained.

Figure 2:
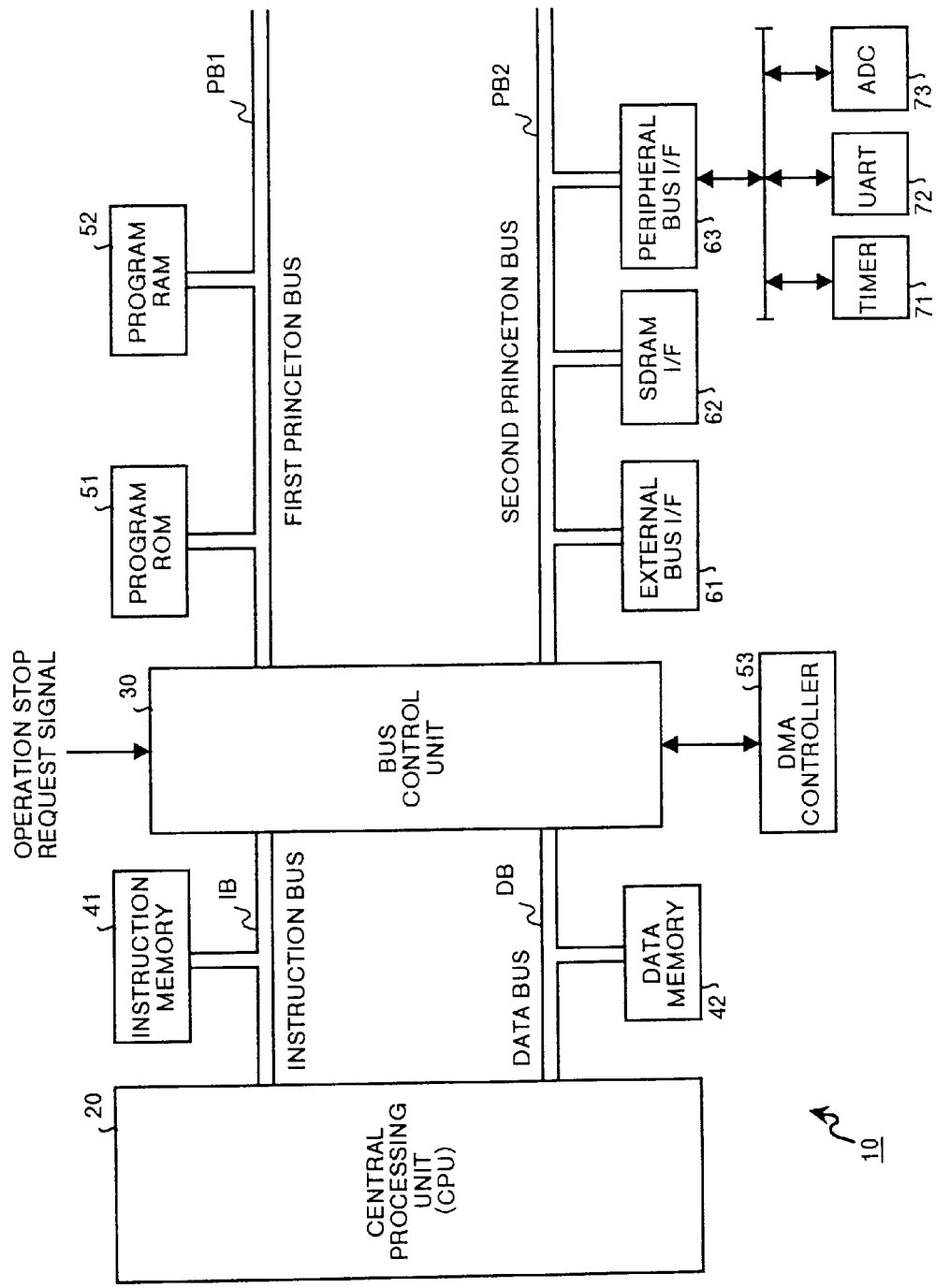
FIG. 2 is a diagram for explaining the principle of a microprocessor according to the present invention.

FIG. 2 is a diagram for explaining the principle of the microprocessor relating to the present invention. As shown in FIG. 2, a microprocessor 10 includes a CPU (Central Processing Unit) 20 for executing instructions according to program codes, a bus control unit 30 for carrying out a bus arbitration by monitoring the state of using a plurality of buses, an instruction memory 41 as a memory for exclusively storing instructions, a data memory 42 as a memory for exclusively storing data, a program ROM 51 for storing a start instruction set and a basic instruction set, a program RAM 52 for storing a user program, a DMA controller 53 for controlling a DMA transfer, an external bus I/F 61 for being connected to external units, to carry out a functional expansion or data input to and output from the external units, an SDRAM I/F 62 for making it possible to expand an SDRAM as an extended memory, and a peripheral bus I/F 63 for executing a function as an interface with incorporated peripheral devices.

Between the CPU 20 and the bus control unit 30, there are provided an instruction bus IB and a data bus DB to have a structure employing the above-described Harvard architecture. The program ROM 51 and the program RAM 52 are connected to a first Princeton bus PB1 that is managed by the bus control unit 30. The external bus I/F 61, the SDRAM I/F 62 and the peripheral bus I/F 63 are connected to a second Princeton bus PB2 that is also managed by the bus control unit 30. The DMA controller 53 is connected directly to the bus control unit 30.

Figure 1:
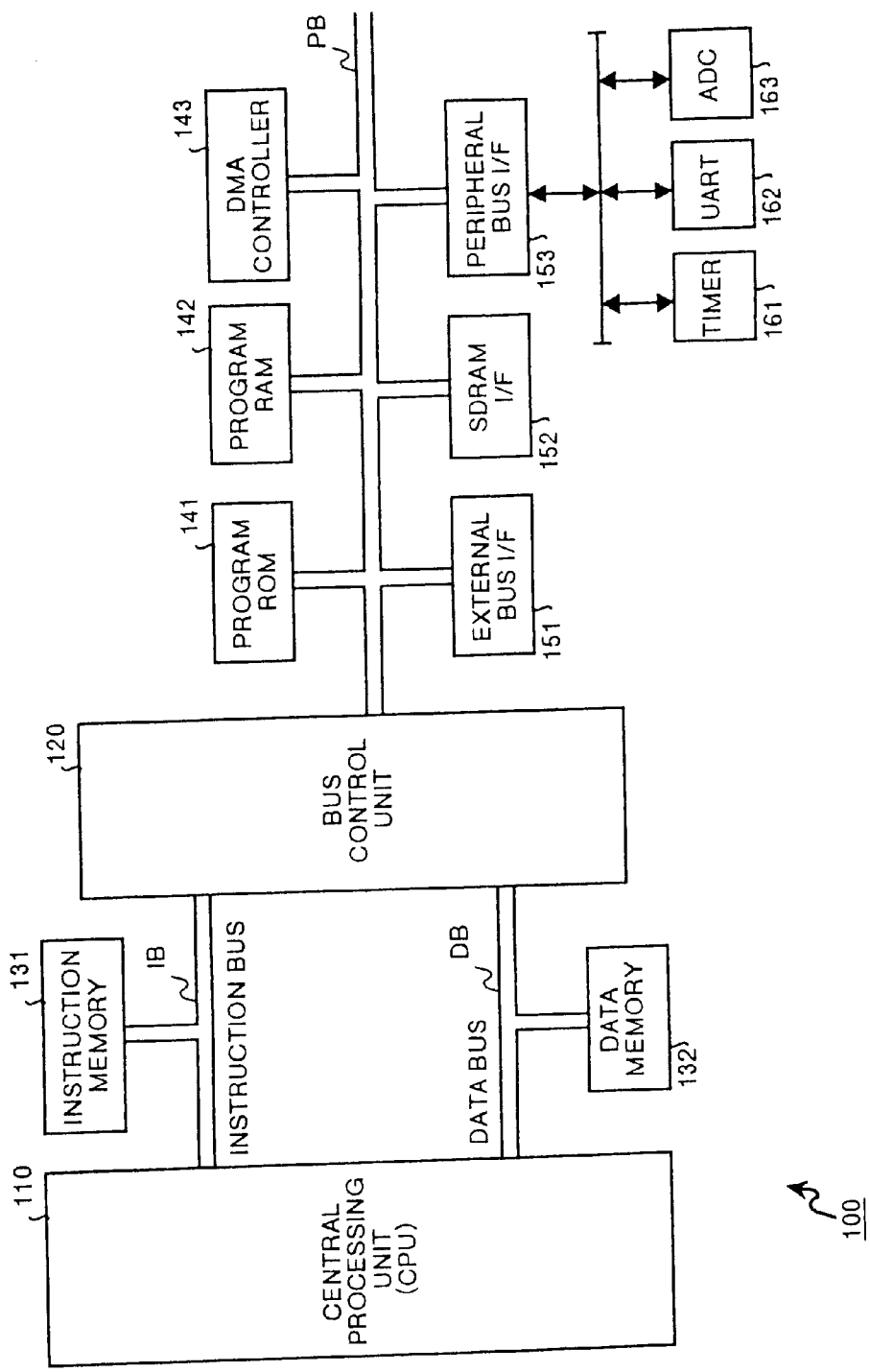
FIG. 1 is a block diagram for showing a schematic configuration of a prior-art microprocessor employing a Harvard architecture.

A timer 71, a UART 72 for supporting a serial communication, an analog/digital converter 73 and the like are connected to the peripheral bus I/F 63 as incorporated peripheral devices. These units are similar to those of the conventional microprocessor shown in FIG. 1, and their explanation will be omitted.

The instruction bus IB, the data bus DB, the first Princeton bus PB1 and the second Princeton bus PB2 include a data bus for transferring data and an address bus for transferring an address, respectively. Each module, including the CPU 20, connected to each of these buses, is provided with a not illustrated control bus, for transferring control signals such as a bus use request signal necessary for communicating with the bus control unit 30, a read/write signal, an address strobe signal, a data strobe signal, various acknowledge signals, etc.

The operation around the bus access of this microprocessor 10 will be explained next. To begin with, when the CPU 20 cannot obtain a cache hit in the instruction memory 41 and hence the CPU 20 wants to fetch an instruction from the program ROM 51, the CPU 20 transmits a bus use request signal to the bus control unit 30 in order to obtain a bus right for using the first Princeton bus PB1 to which the program ROM 51 is connected.

The program RAM 52 is also connected to the first Princeton bus in addition to the program ROM 51. However, as these are the memories which store the instruction codes, the first Princeton bus can exclusively function as an instruction access bus to be accessed at the time of fetching an instruction.

Accordingly, while an instruction from the program ROM 51 is being stored in the instruction memory 41, the CPU 20 can make an access to a module connected to the second Princeton bus PB2 through the data bus DB. Thus, the microprocessor 10 can make the most of the advantages of the Harvard architecture, and can substantially improve the throughput of the CPU 20.

Further, as the DMA controller 53 as a representative bus master other than the CPU 20 is connected directly to the bus control unit 30 without passing through the buses, it is possible to obtain a bus right promptly in the case of carrying out a DMA transfer through a bus other-than the bus used by the CPU 20. Thus, an efficient bus control can also be achieved in the bus control unit 30 as well.

Further, the bus control unit 30 can input an operation stop request signal. Therefore, when a stand-by operation is necessary, by receiving this operation stop request signal, the bus control unit 30 carries out the following operation to the buses connected to the bus control unit 30. The bus control unit 30 transmits a hold request signal representing a hold request of the instruction bus IB to the CPU 20 as the bus master, in order to obtain a bus right for using the instruction bus IB. After finishing the bus cycle of the instruction fetch under execution, the CPU 20 returns an acknowledge signal representing a bus release of the instruction bus IB.

The data bus DB is also handled in a similar manner. The bus control unit 30 transmits a hold request signal representing a hold request of the data bus DB to the CPU 20. Then, the bus control unit 30 receives an acknowledge signal representing a bus release of the data bus DB from the CPU 20, thereby to obtain a bus right for using the data bus DB.

Upon receiving the bus rights for using the instruction bus IB and the data bus DB, the bus control unit 30 makes active an operation stop indication signal prepared for each of the instruction bus IB, the data bus DB, the first Princeton bus PB1 and the second Princeton bus PB2.

When the operation stop indication signal provided in the bus control unit 30 is made active, the modules connected to the instruction bus IB, the data bus DB, the first Princeton bus PB1 and the second Princeton bus PB2 receive an operation stop indication signal, and interrupt the input of a clock signal supplied to these modules, thereby to hold their operation. Thus, a stand-by state of the microprocessor is obtained without the store operation of the CPU 20, and the stand-by operation can be easily obtained at the time of confirming a test operation.

To enhance the understanding of the microprocessor of the present invention that operates based on the above-described principle, detailed embodiments will now be explained.

Figure 3:
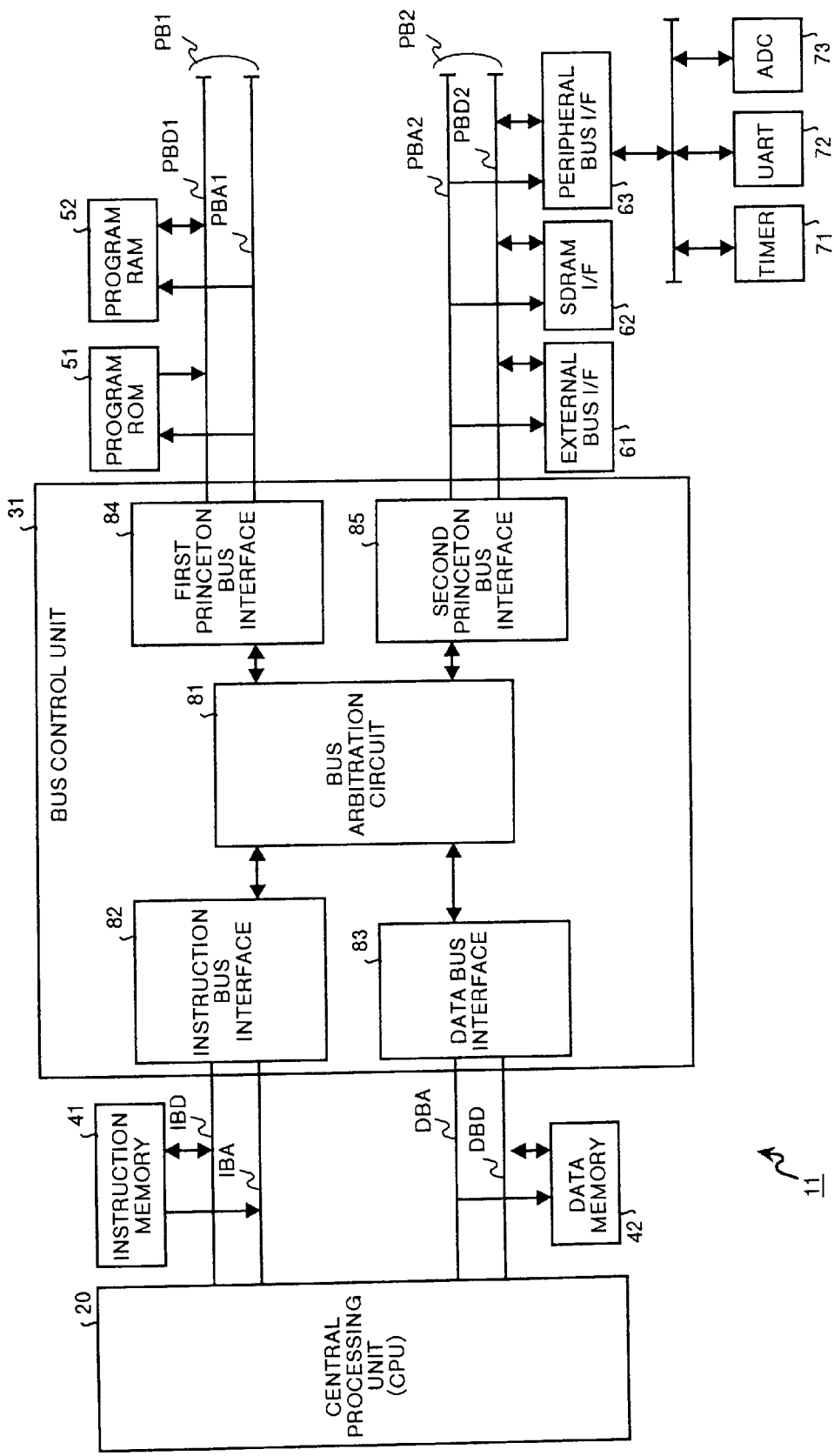
FIG. 3 is a block diagram which shows a schematic configuration of a microprocessor relating to a first embodiment of the present invention.

FIG. 3 is a block diagram which shows a schematic configuration of a microprocessor relating to a first embodiment of the present invention. Portions identical with those in FIG. 2 are provided with the same reference numerals, and their explanation will be omitted. As shown in FIG. 3, a bus control unit 31 is a device for carrying out a bus control of the instruction bus IB, the data bus DB, the first Princeton bus PB1 and the second Princeton bus PB2, in a manner similar to the bus control unit 30 in FIG. 2.

The instruction bus IB consists of an address bus IBA through which an address of a bus master fetching an instruction is transferred and a data bus IBD through which data representing an instruction code is transferred. Similarly, the data bus DB consists of an address bus DBA through which an address of an access destination for reading/writing data is transferred and a data bus DBD through which data to be read/written is transferred. Similarly, the first Princeton bus PB1 consists of an address bus PBA1 and a data bus PBD1, and the second Princeton bus PB2 consists of an address bus PBA2 and a data bus PBD2.

The bus control unit 31 includes an instruction interface 82 that becomes a connection interface of the instruction bus IB, a data bus interface 83 that becomes a connection interface of the data bus DB, a first Princeton bus interface 84 that becomes a connection interface of the first Princeton bus PB1, a second Princeton bus interface 85 that becomes a connection interface of the second Princeton bus PB2, and a bus arbitration circuit 81 connected to these bus interfaces to carry out a bus arbitration.

Figure 4:
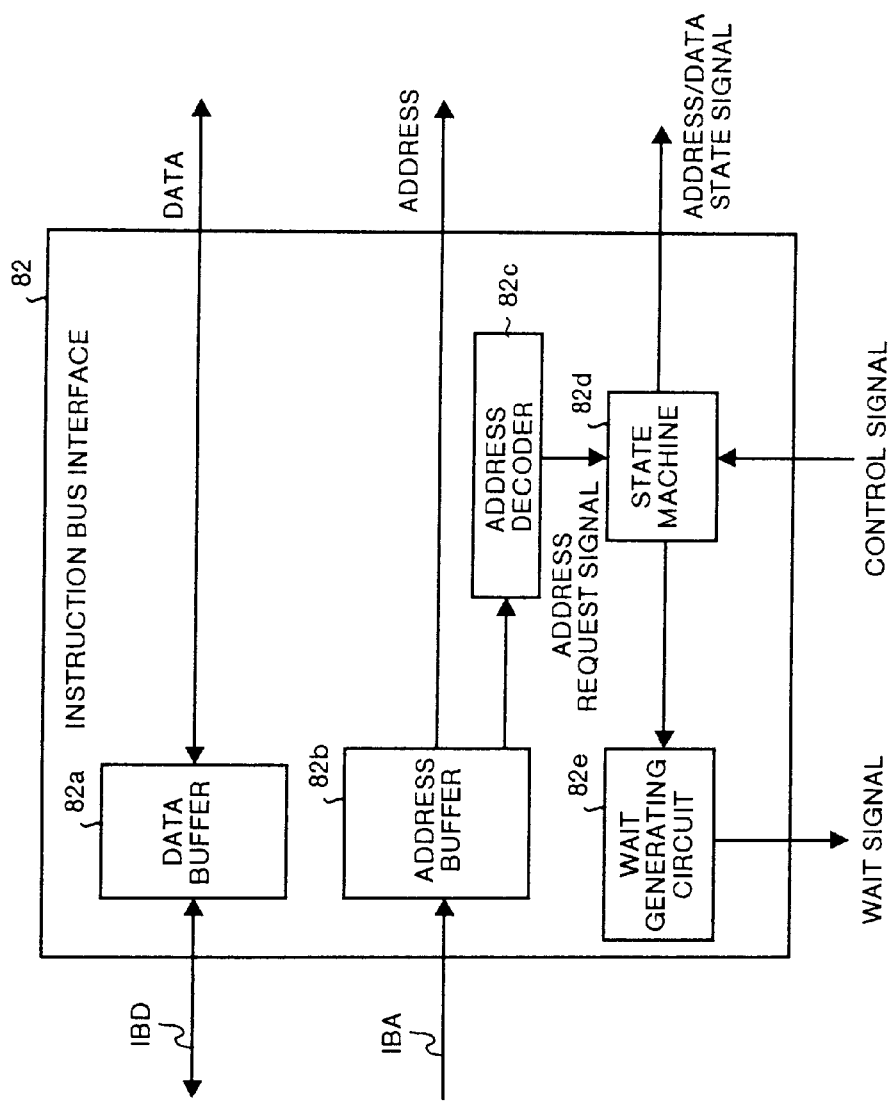
FIG. 4 is a block diagram which shows a schematic configuration of an instruction interface in the first embodiment of the present invention.

The configuration and the operation of the instruction interface 82 will be explained next. FIG. 4 is a block diagram for showing a schematic configuration of the instruction interface 82. As shown in FIG. 4, the instruction interface 82 includes a data buffer 82a for temporarily storing data on the data bus IBD, an address buffer 82b for temporarily storing an address on the address bus IBA, an address decoder 82c for decoding an address stored in the address buffer 82b to specify a bus and a module to be accessed, a state machine 82d for inputting control signals, such as a bus use request signal, a read/write signal, etc., from each module and for setting a bus using state, a state of the instruction bus IB in this case, and a WAIT generating circuit 82e for outputting a WAIT signal to the module using this bus, according to a bus state shown by the state machine 82d.

The state machine 82d will be explained next. In general, when a control not so complicated to be executed by a microcomputer is carried out or when a high-speed control processing is required, there is used a circuit configuration for carrying out various controls by combining a gate and a latch.

For example, this circuit may be used in combination with the microcomputer in such a way that the CPU of the microcomputer carries out the whole processing of the system and this circuit carries out a part of the controls. On the other hand, in the control system, the state shifts sequentially according to the progress of the control. Even if the same signal has been input, the contents of the control are different depending on the state. The system in which the state changes sequentially according to the progress of the control is called a state shifting system, which is structured by the combination of the gate and the latch.

The control circuit for the changing state is called a state machine.

According to the above-described control signals and the state of storage in the data buffer 82a and the address buffer 82b, the state machine 82d generates a state signal representing a state of bus access in which a bus, the instruction bus IB in this case, is currently positioned. That is, the bus is in any one of a non-access state, a reading state, a continuous reading state, a writing state, etc. Then, the state machine 82d outputs an address/data state signal for executing a bus selection based on the above state, an address request signal output from the address decoder 82c and a control signal from the module to which there has been an access request.

The WAIT generating circuit 82e is a circuit for obtaining a bus state generated by the state machine 82d and for transmitting a WAIT signal for showing a wait indication to the module that has generated a bus use request signal to use this bus, when the bus is busy.

Data stored in the data buffer 82a, a physical address generated by the address decoder 82c and a bus state signal representing a bus state set by the state machine 82d are input to the bus arbitration circuit 81.

The state machine 82d can be in two exclusive state machines, one exclusively use for data and the other exclusively use for addresses, and they can set states individually. With this arrangement, the bus arbitration circuit 81 can carry out an optimum bus arbitration in a bus cycle focusing on a use state between the data bus IBD and the address bus IBA.

For example, immediately after an address on the address bus has been latched in the accessed module, the address bus is released prior to the release of the data bus, so that this address bus can be used by other module, thereby to increase the use efficiency of the buses as a whole.

Other bus interfaces such as the data bus interface 83, the first Princeton bus interface 84 and the second Princeton bus interface 85, have also structures including a data buffer, an address buffer, an address decoder, a state machine and a WAIT generating circuit, respectively, in a manner similar to the above-described instruction interface 82. Explanation of these interfaces will be omitted.

It is assumed that the data bus interface 83 is structured by a data buffer 83a, an address buffer 83b, and address decoder 83c, a state machine 83d and a WAIT generating circuit 83e. Similarly, it is assumed that the first Princeton bus interface 84 and the second Princeton bus interface 85 are also structured respectively by a data buffer 84a, an address buffer 84b, an address decoder 84c, a state machine 84d, and a WAIT generating circuit 84e, and a data buffer 85a, an address buffer 85b, an address decoder 85c, a state machine 85d, and a WAIT generating circuit 85e.

Accordingly, the bus control unit 31 has individual data buffers 82a to 85a and address buffers 82b to 85b for the instruction bus IB, the data bus DB, the first Princeton bus PB1 and the second Princeton bus PB2, and can hold data and addresses in these buffers. Therefore, when an accessed module is busy, for example, it is not necessary to retransmit data and an address. Immediately after the busy state of the accessed module is released, it is possible to transfer the data and the address from the data buffers 82a to 85a and the address buffers 82b to 85b. As a result, the throughput of the bus master and the accessed module can be improved.

Further, as the buses have their own address decoders 82c to 85c respectively, and each bus interface section can output their own address request signal, the bus control unit 31 can disperse the load applied by the decode processing for specifying a bus to be accessed. In addition, the bus utilization efficiency can be improved.

Further, as the buses have their own state machines 82d to 85d respectively, it is possible to set own bus using state for each bus, and an individual bus connection request can be made to the bus arbitration circuit 81 to be described later. Therefore, the load can be decreased and the design can be simplified, as compared with the case where one state machine is provided in the bus arbitration circuit 81 for managing all the bus using states.

Further, as the buses have their own WAIT generating circuits (82e to 85e), it is possible to generate own WAIT signal for each bus, and an individual wait indication can be generated to a module that has generated a request for using the bus. Therefore, the load can be decreased and the design can be simplified, as compared with the case where one WAIT generating circuit is provided in the bus arbitration circuit 81 for generating WAIT signals according to the respective using states of all the buses.

Figure 5:
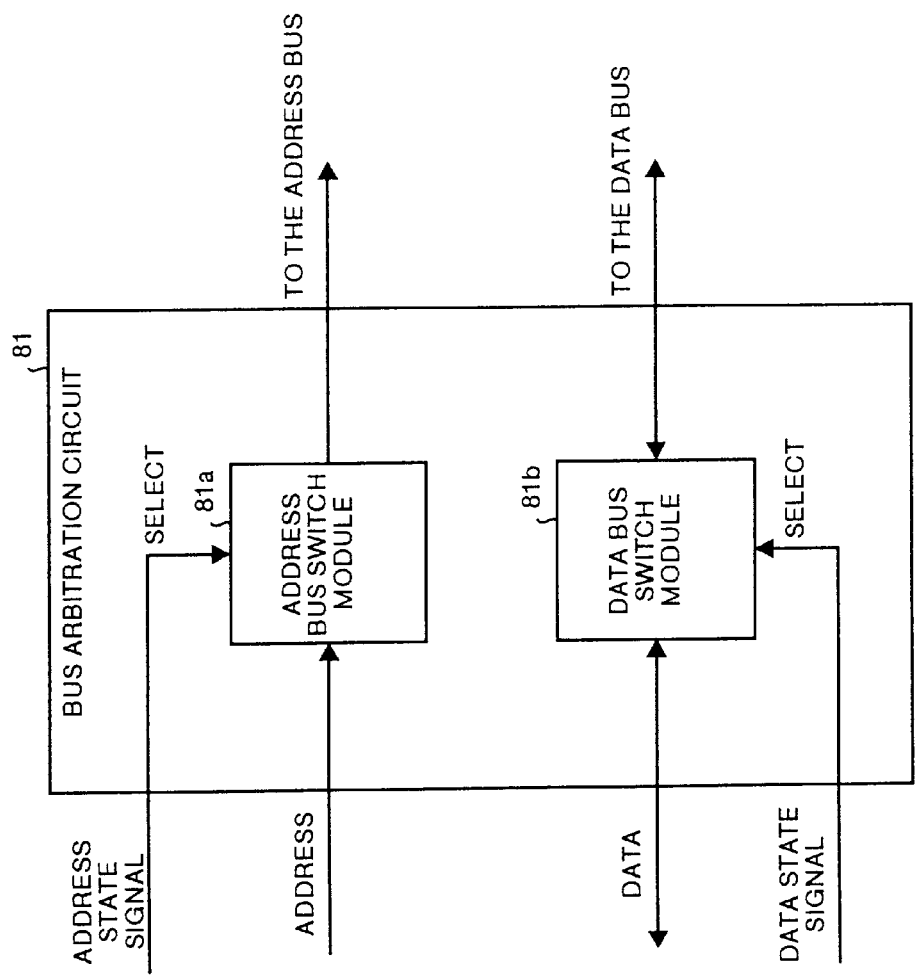
FIG. 5 is a block diagram which shows a schematic configuration of a bus arbitration circuit in the first embodiment.

Next, the configuration and the operation of the bus arbitration circuit 81 will be explained by taking an example of a case where the CPU 20 obtains a bus right for using the instruction bus IB and the first Princeton bus PB1 and carries an instruction fetch from the program ROM 51. FIG. 5 is a block diagram which shows a schematic configuration of the bus arbitration circuit 81.

As shown in FIG. 5, the bus arbitration circuit 81 includes an address bus switch module 81a for specifying a bus, the first Princeton bus PB1 in this case, to be accessed based on an address state signal input from a bus interface, the instruction interface 82 in this case, and for sending the address input from the bus interface to an address bus, the address bus PBA1 in this case, and a data bus switch module 81b for specifying a bus, the first Princeton bus PB1 in this case, to be accessed based on a data state signal input from a bus interface, the instruction interface 82 in this case, and for sending the address input from the bus interface to an address bus, the data bus PBD1 in this case.

The address and the data output from the bus arbitration circuit 81 are transferred to the corresponding address bus and the data bus actually through the bus interface, the first Princeton bus interface 84 in this case.

Next, with reference to FIGS. 3 to 5 explained above, there will be explained below the flow of the operation of the microprocessor 11 until when the CPU 20 obtains an instruction code from the program ROM 51 by an instruction fetch. It is assumed that a cache hit in the instruction memory 41 has not been obtained.

At first, the CPU 20 transmits a bus use request signal for using the instruction bus IB and the first Princeton bus PB1 respectively to the bus control unit 31 through the not illustrated control bus. As only the module for instruction access by the CPU 20 is connected to the first Princeton bus PB1, a bus right of the first Princeton bus PB1 can be obtained immediately, under the circumstance that a bus master other than the CPU 20 is not connected to the first Princeton bus PB1.

Upon obtaining a bus right for using the first Princeton bus PB1, the CPU 20 transmits an address shown by the program counter of the CPU 20 to the address bus IBA of the instruction bus IB. The instruction interface 82 holds this address in the address buffer 82b, and, at the same time, transmits this address to the address decoder 82c. The address decoder 82c decodes the address transmitted through the address buffer 82b, and outputs an address request signal.

Then, the state machine 82d inputs a read signal from the CPU 20 as a control signal, together with the address request signal output from the address decoder 82c, to indicate that the state of the instruction bus has changed from the non-access state to the read state. At the same time, the state machine 82d outputs an address/data state signal for showing a bus identification code of the first Princeton bus PB1 to be accessed.

In this case, as the instruction bus IB is occupied by the CPU 20, the WAIT generating circuit 82e obtains the read state set by the state machine 82d, thereby to make active the WAIT signal. The other modules are made to wait for making an access to the instruction bus IB by this WAIT signal in the active state.

The data, address, and address/data state signal output from the instruction interface 82 are input to the bus arbitration circuit 81. In the bus arbitration circuit 81, at first, an address bus switch for the first Princeton bus PB1 is selected based on the input of the address state signal in the address bus switch module 81a, and the input address is output to the address bus PBA1 of the first Princeton bus PB1.

Similarly, in the data bus switch module 81b, a data bus switch for the first Princeton bus PB1 is selected based on the input of the data state signal, so that the data bus IBD of the instruction bus and the data bus PBD1 of the first Princeton bus PB1 are connected together.

In reality, the address output from the bus arbitration circuit 81 is output to the address bus PBA1 of the first Princeton bus PB1 through the first Princeton bus interface 84. Similarly, the data bus IBD of the instruction bus and the data bus PBD1 of the first Princeton bus PB1 are connected together through the first Princeton bus interface 84.

The state machine 84d of the first Princeton bus interface 84 has the first Princeton bus PB1 specified in the bus arbitration circuit 81, inputs a read signal from the CPU 20 as a control signal, and shows that the state of the first Princeton bus PB1 has been changed from the non-access state to the read state.

In this case, as the first Princeton bus PB1 is occupied by the CPU 20, the WAIT generating circuit 84e obtains the read state set by the state machine 84d, thereby to make active the WAIT signal. The other modules are made to wait for making an access to the first Princeton bus PB1 by this WAIT signal in the active state.

On the other hand, the program ROM 51 receives an address strobe signal representing that an effective address is being transmitted on the address bus PBA1, through the not illustrated control bus from the bus control unit 31. Thus, the program ROM 51 fetches the address transmitted to the address bus PBA1 of the first Princeton bus PB1, takes out a corresponding instruction code from the memory area shown by this address, and transmits this instruction code to the data bus PBD1 of the first Princeton bus PB1.

Then, the program ROM 51 transmits a data acknowledge signal representing the completion of the data transmission, to the bus control unit 31 through the not illustrated control bus.

Upon receiving the data acknowledge signal, the bus control unit 31, more specifically the bus arbitration circuit 81, transmits the data transmitted to the data bus PBD1 of the first Princeton bus PB1, to the data buffer 82a of the instruction interface 82.

In this case, when the CPU 20 shows a BUSY state because of other processing, and cannot receive data instantly, for example, the data to be received is held in the data buffer 82a. Therefore, the CPU 20 can receive this data through the data bus IBD of the instruction bus IB immediately after the BUSY state has been canceled.

Thereafter, a bus release signal for releasing the instruction bus IB and the first Princeton bus PB1 is transmitted to the bus control unit 31. At the same time, the WAIT signal in the instruction interface 82 and the first Princeton bus interface 84 is set to the non-active state, and the shift state of the state machine is returned to the non-access state.

Next, the flow of the operation of the microprocessor 11 will be explained for the case where the CPU 20 writes data to the SDRAM I/F 62 connected to the second Princeton bus PB2 simultaneously with a starting of the access processing to the program ROM 51 by the CPU 20. It is assumed that a cache hit in the data memory 42 has not been obtained.

In this case, the CPU 20 transmits a bus use request signal for using the data bus DB and the second Princeton bus PB2 respectively to the bus control unit 31 through the not illustrated control bus. As only the module for instruction access by the CPU 20 is connected to the first Princeton bus PB1, a bus right of the second Princeton bus PB2 can be obtained immediately, under the circumstance that a bus master other than the CPU 20 is not connected to the first Princeton bus PB1.

Upon obtaining a bus right for using the second Princeton bus PB2, the CPU 20 transmits an address for storing the data shown in the instruction register of the CPU 20, to the address bus DBA of the data bus IB. The data bus interface 83 holds this address in the address buffer similar to the instruction interface 82, and, at the same time, transmits this address to the address decoder 83*c*. The address decoder 83*c* decodes the address transmitted through the address buffer 83*b*, and outputs an address request signal.

Further, the CPU 20 transmits the data shown in the instruction register of the CPU 20, to the data bus DBD of the data bus DB. The data bus interface 83 holds the address on the address bus DBA in the address buffer in a similar manner to the instruction interface 82, and, at the same time, transmits this address to the address decoder 83*c*. The address decoder 83*c* decodes the address transmitted through the address buffer 83*b*, and outputs an address request signal. The data on the data bus DBD is also held in the data buffer 83*a* in a similar manner.

Then, the state machine 83*d* inputs a write signal from the CPU 20 as a control signal, together with the address request signal output from the address decoder 83*c*, to indicate that the state of the data bus DB has changed from the non-access state to the write state. At the same time, the state machine 83*d* outputs an address/data state signal for showing a bus identification code of the second Princeton bus PB2 to be accessed.

In this case, as the data bus DB is occupied by the CPU 20, the WAIT generating circuit 83*e* obtains the write state set by the state machine 83*d*, thereby to make active the WAIT signal. The other modules are made to wait for making an access to the data bus DB by this WAIT signal in the active state.

The data, address, and address/data state signal output from the data bus interface 83 are input to the bus arbitration circuit 81. In the bus arbitration circuit 81, at first, an address bus switch for the second Princeton bus PB2 is selected by the input of the address state signal in the address bus switch module 81*a*, and the input address is output to the address bus PBA2 of the second Princeton bus PB2.

Similarly, in the data bus switch module 81*b*, a data bus switch for the second Princeton bus PB2 is selected by the input of the data state signal, so that the data bus DBD of the data bus and the data bus PBD1 of the second Princeton bus PB2 are connected together.

In reality, the address output from the bus arbitration circuit 81 is output to the address bus PBA2 of the second Princeton bus PB2 through the second Princeton bus interface 85. Similarly, the data bus DBD of the data bus and the data bus PBD2 of the second Princeton bus PB2 are connected together through the second Princeton bus interface 85.

The state machine 85*d* of the second Princeton bus interface 85 has the second Princeton bus PB2 specified in the bus arbitration circuit 81, inputs a write signal from the CPU 20 as a control signal, and shows that the state of the second Princeton bus PB2 has been changed from the non-access state to the write state.

In this case, as the second Princeton bus PB2 is occupied by the CPU 20, the WAIT generating circuit 85*e* obtains the write state set by the state machine 85*d*, thereby to make active the WAIT signal. The other modules are made to wait for making an access to the second Princeton bus PB2 by this WAIT signal in the active state.

On the other hand, the SDRAM I/F 62 receives an address strobe signal for showing that an effective address is being transmitted on the address bus PBA2, through the not illustrated control bus from the bus control unit 31. Thus, the SDRAM I/F 62 fetches the address transmitted to the address bus PBA2 of the second Princeton bus PB2, and stores the data transmitted on the data bus PDB2 in the memory area shown by this address.

Then, the SDRAM I/F 62 transmits a data acknowledge signal for showing the completion of the data storing, to the bus control unit 31 through a control bus (not shown). Thus, the CPU 20 finishes the access processing to the SDRAM I/F 62. Thereafter, a bus release signal for releasing the second Princeton bus PB2 is transmitted to the bus control unit 31. At the same time, the WAIT signal in the data bus interface 83 and the second Princeton bus interface 85 is set to the non-active state, and the shift state of the state machine is returned to the non-access state.

As explained above, the CPU 20 can simultaneously carry out the instruction access and the data access, so that the buses can be used highly efficiently by making the most of the advantages of the Harvard architecture.

Figure 6:
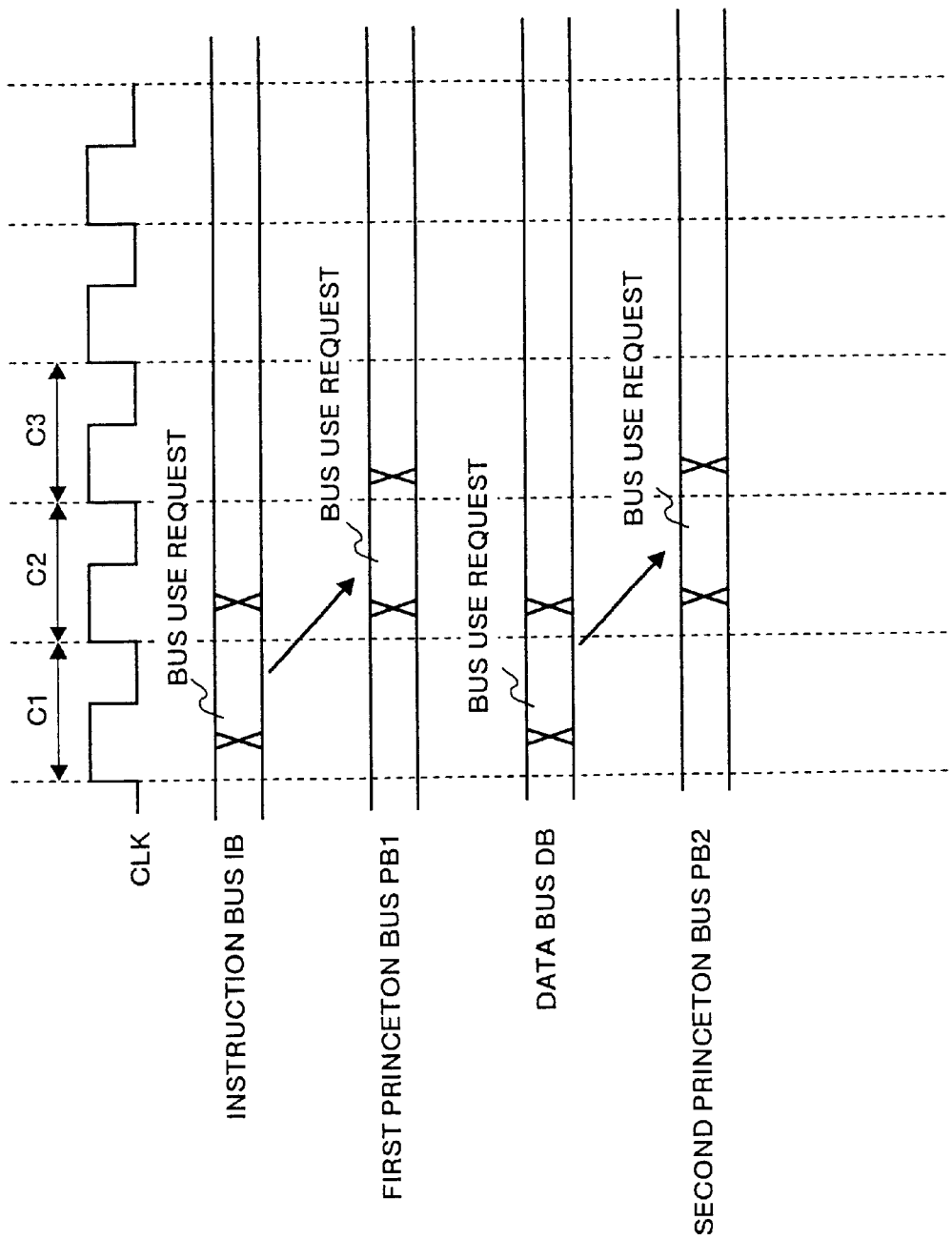
FIG. 6 is a timing chart for explaining a state of a simultaneous access of a first Princeton bus and a second Princeton bus by a CPU in the first embodiment.

FIG. 6 is a timing chart for explaining the simultaneous access of the first Princeton bus PB1 and the second Princeton bus PB2 by the CPU 20. As shown in FIG. 6, the CPU 20 can issue simultaneously a request for using the instruction bus IB and a request for using the data bus DB in two cycles of C1 and C2 of a system clock CLK. The CPU 20 can also issue simultaneously a request for using the first Princeton bus PB1 and a request for using the second Princeton bus PB2 in the subsequent two cycles of C2 and C3.

Further, the bus arbitration circuit 81 can set a priority order of the buses including the instruction bus IB, the data bus DB, the first Princeton bus PB1 and the second Princeton bus PB2, when bus connection requests have been issued simultaneously from each bus interface.

For example, when bus connection requests to the instruction bus IB and the data bus DB have been issued from the CPU 20, it is possible to connect to the data bus DB with high priority. The priority order of bus connections may be changed according to the need, by structuring such that the bus arbitration circuit 81 receives from the CPU 20 a priority order signal for setting the priority order.

As explained above, according to the microprocessor 11 relating to the first embodiment of the present invention, the modules of the program ROM 51, the program RAM 52 and the like in which instruction accesses are concentrated by the CPU 20 are put together in the first Princeton bus PB1, and the modules of the external bus I/F 61, the SDRAM I/F 62, the peripheral bus I/F 63 and the like in which mainly data accesses are concentrated are put together in the second Princeton bus PB2.

As a result, it is possible to make the most of the advantages of the configuration employing the Harvard architecture in which the instruction accesses and data accesses are carried out by the individual exclusive buses of the instruction bus and the data bus through the bus control unit 31. Thus, the instruction access and the data access can be carried out in parallel, which makes it possible to efficiently use the buses and to substantially improve the throughput of the CPU 20.

In the microprocessor 11 relating to the first embodiment, the state machines 82d to 85d and the WAIT generating circuits 82e to 85e are provided respectively in each of the bus interface sections including the instruction interface 82, the data bus interface 83, the first Princeton bus interface 84 and the second Princeton bus interface 85. Alternately, these state machines 82d to 85d and the WAIT generating circuits 82e to 85e may also be provided inside the bus arbitration circuit 81 by corresponding them to each bus interface.

Figure 7:
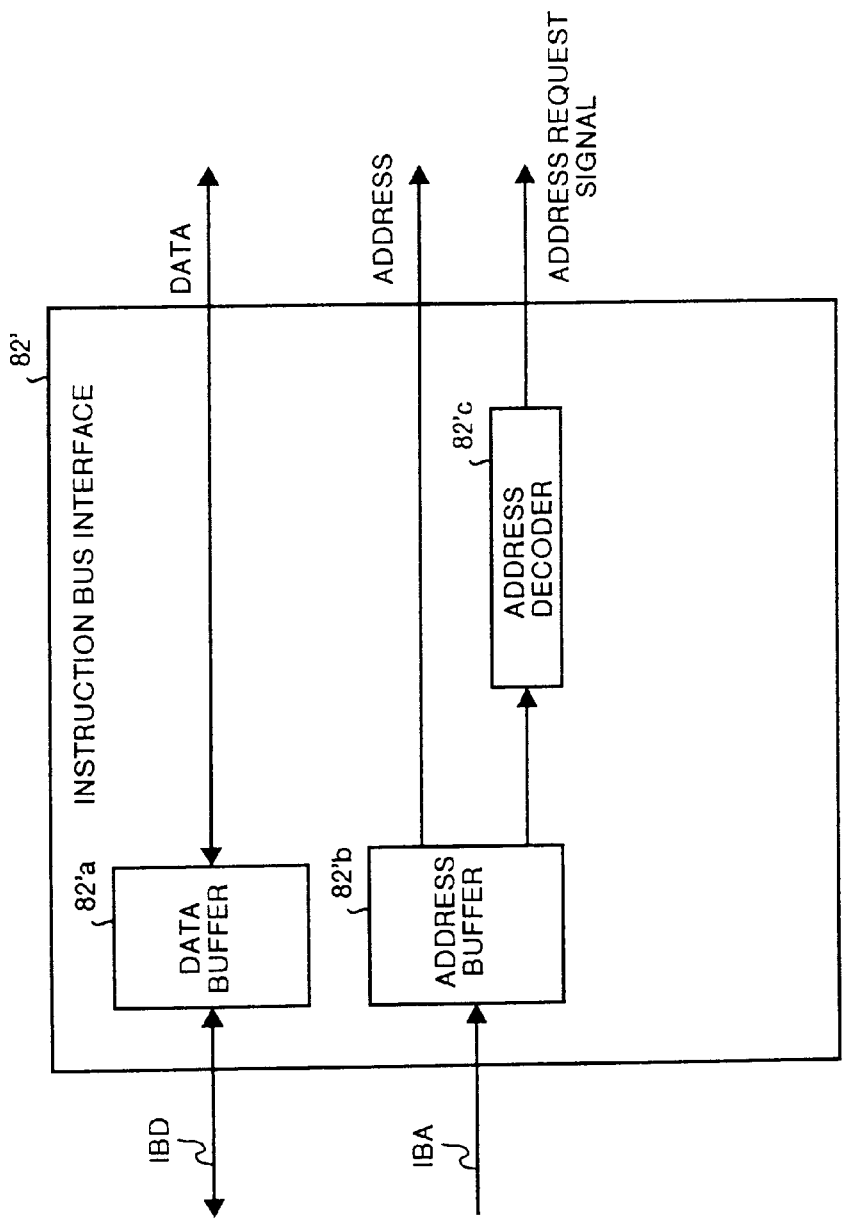
FIG. 7 is a block diagram which shows a schematic configuration of another example of an instruction interface in the first embodiment.
Figure 8:
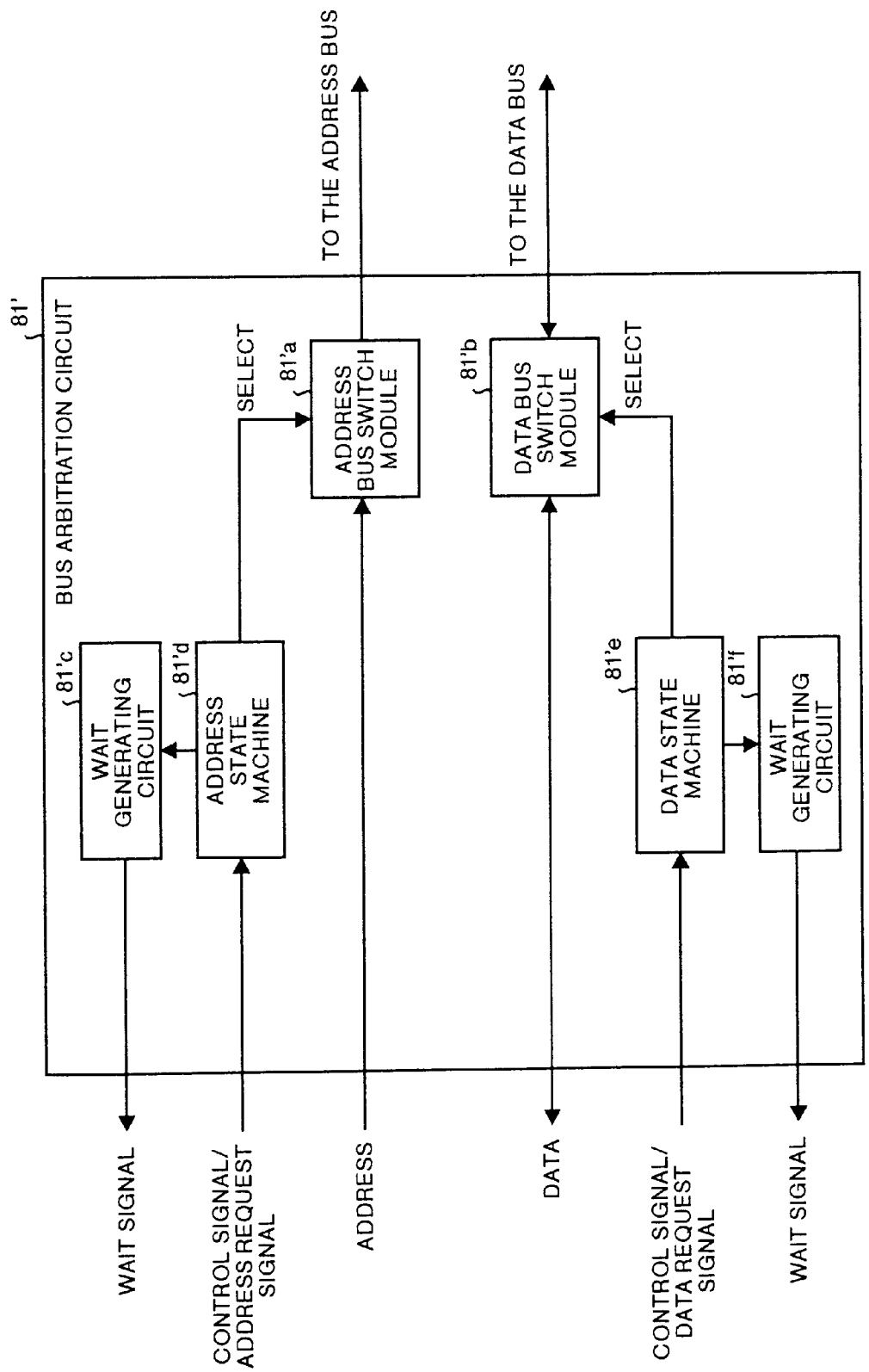
FIG. 8 is a block diagram which shows a schematic configuration of another example of a bus arbitration circuit in the first embodiment.

FIG. 7 is a block diagram which shows a schematic configuration of an instruction interface 82' as an another example of the instruction interface for illustrating this alternative case. FIG. 8 is a block diagram which shows a schematic configuration of a bus arbitration circuit 81' as an another example of the bus arbitration circuit for illustrating this alternative case.

As shown in FIG. 7, the instruction interface 82' includes a data buffer 82'a, an address buffer 82'b and an address decoder 82'c. These buffers have the same functions as the functions of the data buffer 82a, the address buffer 82b and the address decoder 82c shown in FIG. 4, and therefore, explanation of these buffers will be omitted. Other bus interfaces including a data bus interface, a first Princeton bus and a second Princeton bus 25 also have the same structures as the instruction interface 82 On the other hand, as shown in FIG. 8, the bus arbitration circuit 81' includes an address bus switch module 81'a and a data bus switch module 81'b corresponding to the address bus switch module 81a and the data bus switch module 81b shown in FIG. 5 respectively. In addition to the above, the bus arbitration circuit 81' also includes an address WAIT generating circuit 81'c, an address state machine 81'd, a data state machine 81'e and a data WAIT generating circuit 81'f.

The address state machine 81'd and the data state machine 81'e have the same functions as the functions of the state machine 82d shown in FIG. 4. Also, the address WAIT generating circuit 81'c and the data WAIT generating circuit 81'f have the same functions as the functions of the WAIT generating circuit 82e shown in FIG. 4. Therefore, the explanation of these state machines and circuits will be omitted.

Figure 9:
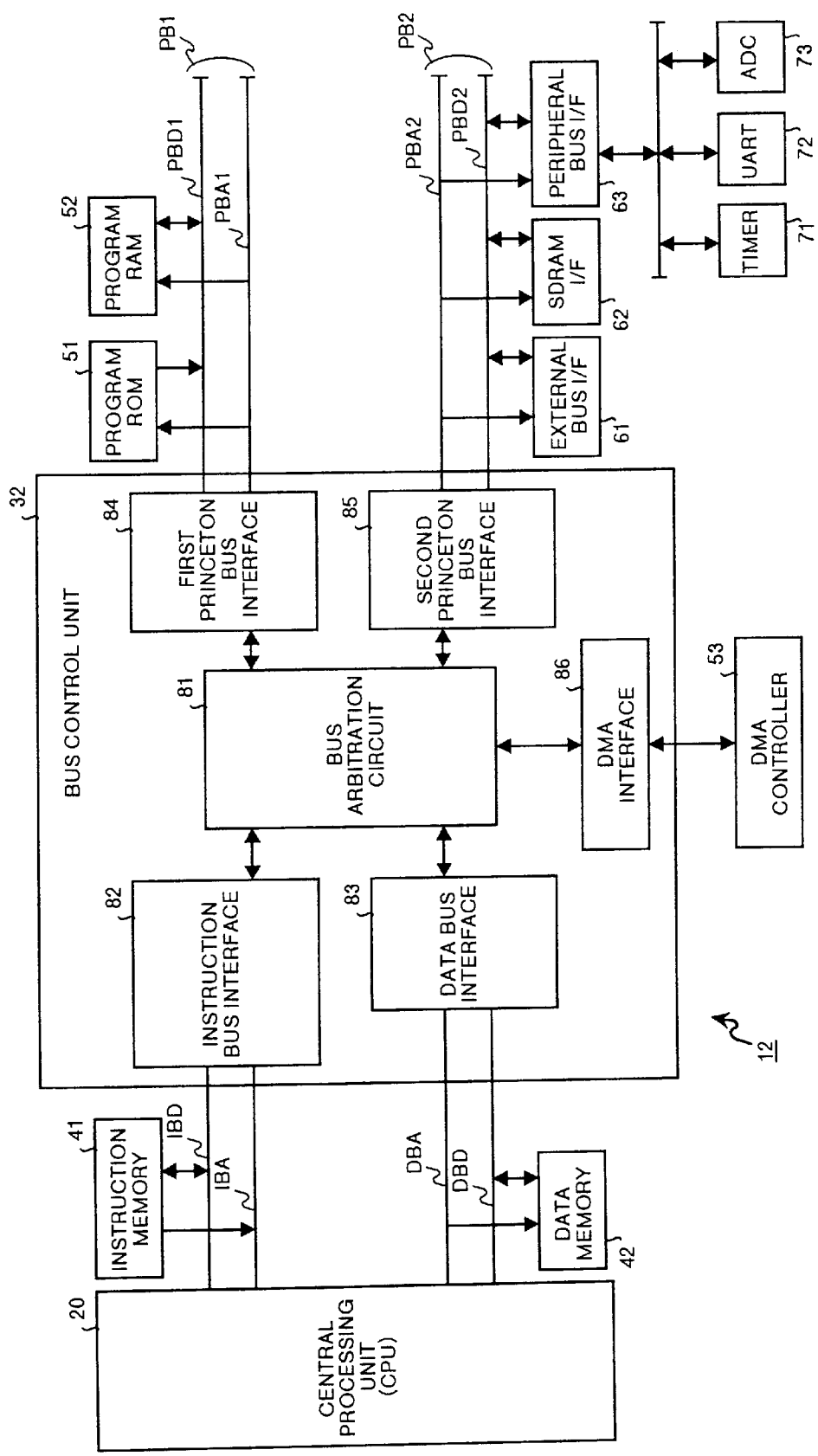
FIG. 9 is a block diagram which shows a schematic configuration of a microprocessor relating to a second embodiment of the present invention.

A microprocessor relating to a second embodiment of the present invention will be explained next. The second embodiment is different from the first embodiment in that the bus control unit 31 includes a DMA interface 86 connected to the bus arbitration circuit 81 and that the DMA controller 53 is connected directly to the bus control unit. FIG. 9 is a block diagram which shows a schematic configuration of the microprocessor relating to the second embodiment. Portions identical with those in FIG. 2 are provided with identical reference numerals, and their explanation will be omitted.

In FIG. 9, a microprocessor 12 has the DMA interface 86 in a bus control unit 32, so that a DMA controller 53 as a representative bus master other than the CPU 20 can be connected directly to the bus control unit 32 without passing through a bus.

With this arrangement, unlike the conventional microprocessor 100, a problem such that it takes longer time to obtain a bus right for using the DMA controller of its own according to the operation of other module connected to the same bus to which the DMA controller is to be connected does not arise. Therefore, it is possible to make a prompt access to the bus arbitration circuit 81 to obtain a bus right for using a bus to which an accessing module and an accessed module are connected respectively in a DMA transfer.

The DMA interface 86 has a data buffer and an address buffer, similar to the bus interfaces of the bus control unit 32 including the instruction interface 82, the data bus interface 83, the first Princeton bus interface 84 and the second Princeton bus interface 85.

With this arrangement, the buffers conventionally provided within the DMA controller can be put together in the bus control unit 32, and the operation of the DMA interface 86 can be controlled as well as the operation of the above-described bus interface by the bus arbitration circuit 81. Therefore, the structure of the DMA controller 53 can be made simple. The design of the bus control unit 32 can also be utilized effectively.

Thus, according to the microprocessor 12 relating to the second embodiment, the DMA controller 53 as a bus master is connected directly to the bus control unit 32 and is managed by the bus arbitration circuit 81. Therefore, as compared with the conventional connection method of the DMA controller, the load applied to the buses can be decreased, and a bus right for a DMA transfer can also be obtained promptly. An efficient bus control can also be achieved in the bus control unit 32.

Further, along with the achievement in the decrease of the load applied to the buses, the parallel processing of the instruction access and the data access that is the advantage of the structure of the Harvard architecture becomes more effective. By the introduction of the DMA controller, it also becomes possible to substantially improve the throughput of the CPU 20.

A microprocessor relating to a third embodiment of the present invention will be explained next. The third embodiment is different from the first and second embodiments in that an external terminal is provided in the bus control unit 31, to obtain a bus control unit 33. According to this bus control unit 33, when a stand-by operation request signal is input to this external terminal, the bus arbitration circuit 81 issues a bus hold request to each bus interface. In a state that a bus right of each bus is obtained, the bus arbitration circuit 81 can transmit an operation stop request signal to modules connected to the buses.

Figure 10:
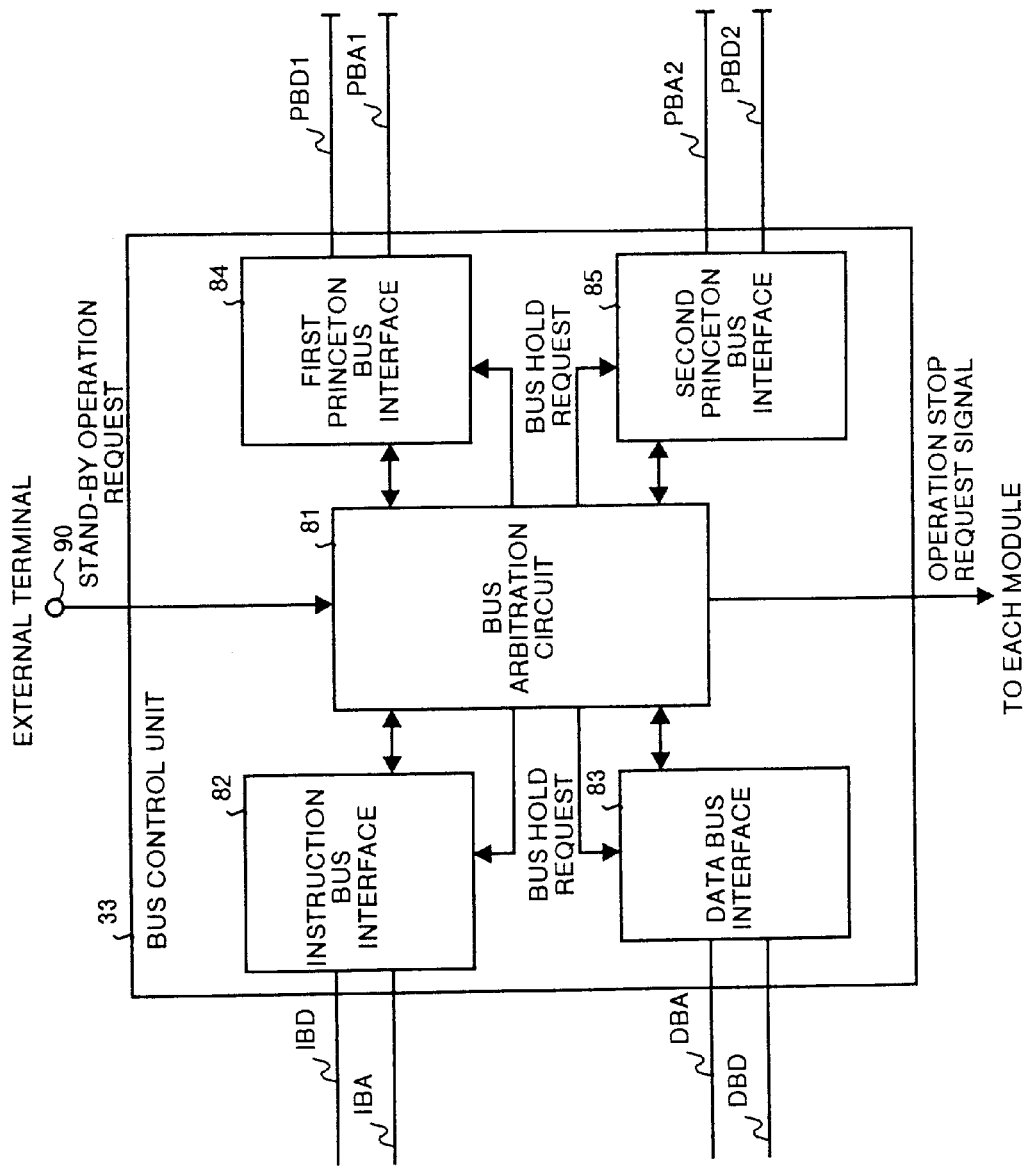
FIG. 10 is a block diagram which shows a schematic configuration of a microprocessor relating to a third embodiment of the present invention.

FIG. 10 is a block diagram which shows a schematic configuration of the microprocessor relating to the third embodiment of the present invention. Portions identical with those in FIG. 2 are provided with identical reference numerals, and the explanation of these portions will be omitted. Description of modules connected to the buses is omitted, and only the bus control unit 33 is shown.

As shown in FIG. 10, an external terminal 90 is connected to the bus arbitration circuit 81 of the bus control unit 33. When it is desired to confirm the stand-by operation of the microprocessor, for example, this external terminal 90 inputs a stand-by operation request signal. When a stand-by operation request signal has been input from the external terminal 90, the bus arbitration circuit 81 transmits a bus hold request signal to the bus interfaces including the instruction interface 82, the data bus interface 83, the first Princeton bus interface 84 and the second Princeton bus interface 85.

More specifically, each bus interface transmits a bus use request signal to a module that has a bus right for using a bus. When the module that received this bus use request signal has finished a bus cycle, the module transmits a bus release signal to the bus interface so that the bus interface having received this release signal obtains the bus right.

When the bus control unit 30 has obtained bus rights for using the instruction bus IB, the data bus DB, the first Princeton bus PB1 and the second Princeton bus PB2, the bus control unit 30 makes active an operation stop indication signal prepared for each of the instruction bus IB, the data bus DB, the first Princeton bus PB1 and the second Princeton bus PB2 respectively.

When this operation stop indication signal is made active, the operation stop request signal is transmitted to each module. Upon receiving this operation stop indication signal, each module interrupts an input of a clock signal being supplied to the module, to hold the operation. Thus, a stand-by state of the microprocessor is obtained without involving a store operation of the CPU 20, and a stand-by operation can be started easily at the time of confirming a test operation.

Figure 11:
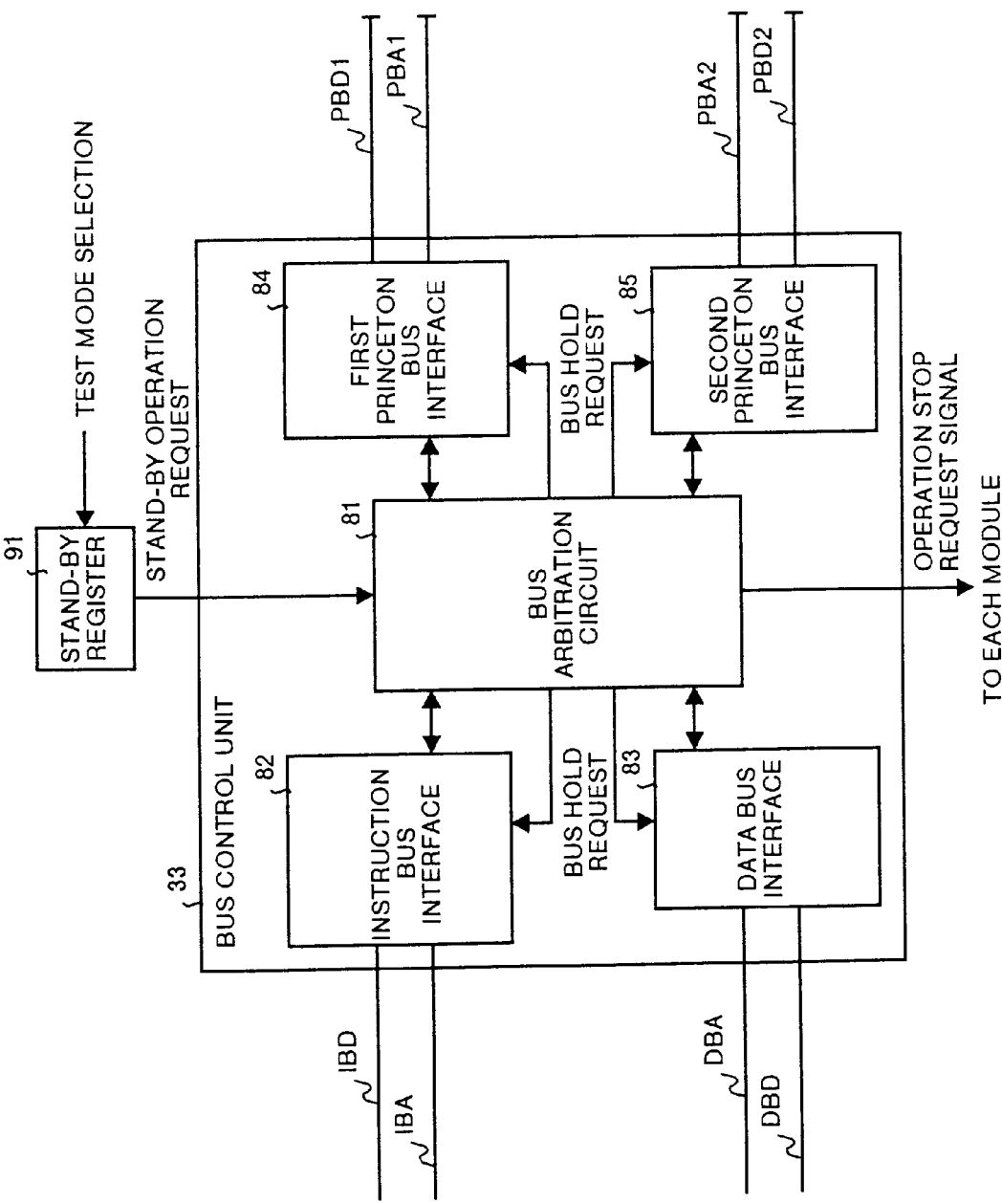
FIG. 11 is a block diagram which shows a schematic configuration of other example of a bus control unit in the third embodiment.

Further, in place of the external terminal 90, it is also possible to provide a stand-by register 91 into which there is written a flag indicating a stand-by operation request by an input of a signal indicating a test mode. FIG. 11 is block diagram which shows a schematic configuration of a bus control unit of other example to illustrate this alternative case. As shown in FIG. 11, the bus control unit has the same operation, except that the external terminal 90 in FIG. 10 has been replaced by the stand-by register 91.

Thus, according to the microprocessor relating to the third embodiment, it is possible to input to the bus control unit 33 a stand-by operation request signal for making a stand-by operation active in a test mode, for example, then obtain a bus right for using each of the instruction bus IB, the data bus DB, the first Princeton bus PB1, and the second Princeton bus PB2, and thereafter hold a supply of a clock signal to each module. Therefore, unlike the conventional practice, it is easily possible to shift the microprocessor to a stand-by operation without involving the need for the CPU 20 to carry out a store operation at the time of a test operation.

The bus control unit 33 shown in FIG. 10 and FIG. 11 may be configured in such a way that the DMA controller is connected directly to the bus control unit, in a similar manner to the bus control unit 32 explained in the second embodiment.

Further, in the first to third embodiments, as modules connected to the instruction bus IB, the memory bus DB, the first Princeton bus PB1 and the second Princeton bus PB2, respectively, there may be connected bus masters other than the DMA controller, for independently issuing a bus use request to the bus control units 30 to 33.

Further, in the first to third embodiments, it is mentioned that the instruction memory 41 and the data memory 42 function as cache memories, however, these memories may not be cache memories but may be used as ordinary memories like a SDRAM connected to the program RAM 52 and the SDRAM I/F 62. For example, it is possible to use the instruction memory 41 as a cache memory and to use the data memory 42 as an ordinary memory.

Figure 12A:
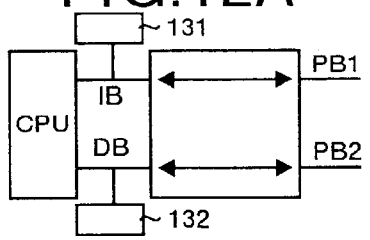
FIGS. 12A to 12O are block diagrams which show the schematic configurations of bus accessing variations.
Figure 12B:
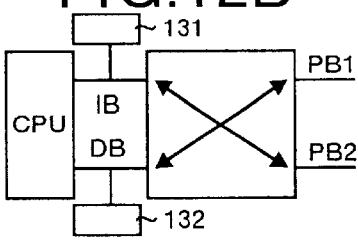
Figure 12C:
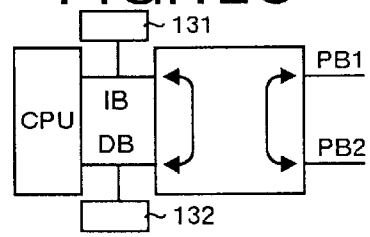
Figure 12D:
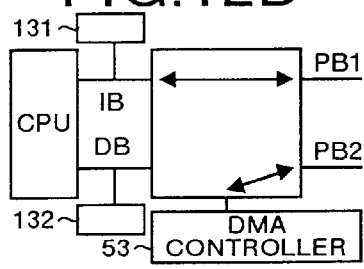
Figure 12E:
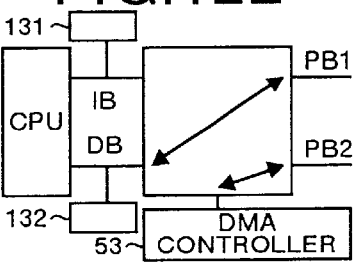
Figure 12F:
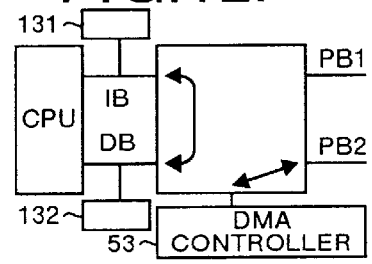
Figure 12G:
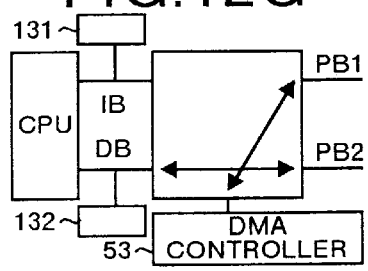
Figure 12H:
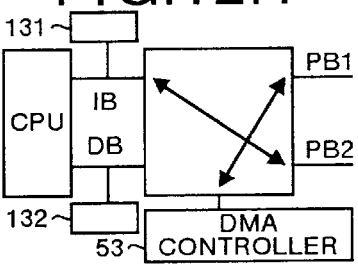
Figure 12I:
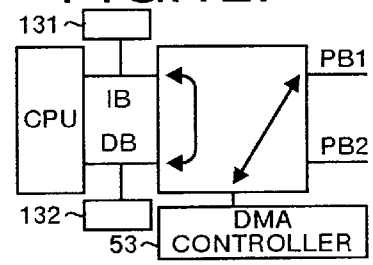
Figure 12J:
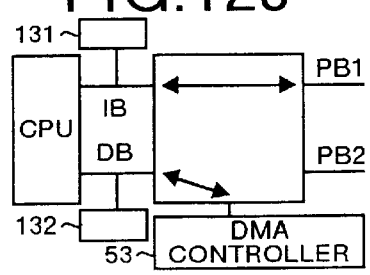
Figure 12K:
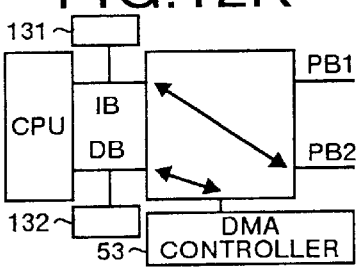
Figure 12L:
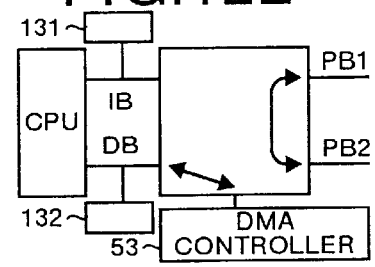
Figure 12M:
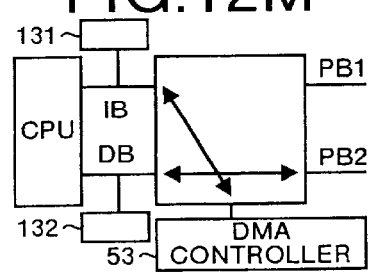
Figure 12N:
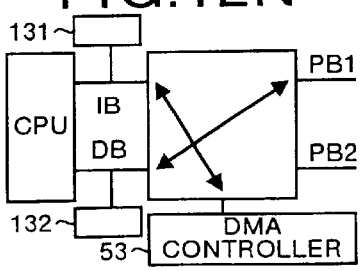
Figure 12O:
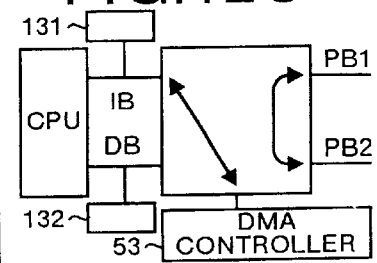

Further, the present invention can be applied to the cases shown in FIG. 12A to FIG. 12O. For example, as shown in FIG. 12A, the instruction memory 131 connected to the instruction bus IB can access the first Princeton bus PB1 and the data memory 132 connected to the data bus DB can access the second Princeton bus PB2 side by side. Similarly, as shown in FIG. 12B, the instruction memory 131 connected to the instruction bus IB can access the second Princeton bus PB2 and the data memory 132 connected to the data bus DB can access to the first Princeton bus PB1. Similarly, as shown in FIG. 12C, the instruction memory 131 connected to the instruction bus IB can access the data memory 132 connected to the data bus DB and the first Princeton bus PB1 can access the second Princeton bus PB2. Similarly, as shown in FIG. 12D, the instruction memory 131 connected to the instruction bus IB can access the first Princeton bus PB1 and the DMA controller 53 can access the second Princeton bus PB2. Similarly, as shown in FIG. 12E, the data memory 132 connected to the data bus DB can access the first Princeton bus PB1 and the DMA controller 53 can access the second Princeton bus PB2. Similarly, as shown in FIG. 12F, the instruction memory 131 connected to the instruction bus IB can access the data memory 132 connected to the data bus DB and the DMA controller 53 can access the second Princeton bus PB2.

Similarly, as shown in FIG. 12G, the data memory 132 connected to the data bus DB can access the second Princeton bus PB2 and the DMA controller 53 can access the first Princeton bus PB1.

Further, as shown in FIG. 12H, the instruction memory 131 connected to the instruction bus IB can access the second Princeton bus PB2 and the DMA controller 53 can access the first Princeton bus PB1. Similarly, as shown in FIG. 12I, the instruction memory 131 connected to the instruction bus IB can access the data memory 132 connected to the data bus DB and the DMA controller 53 can access the first Princeton bus PB1.

Similarly, as shown in FIG. 12J, the instruction memory 131 connected to the instruction bus IB can access the first Princeton bus PB1 and the DMA controller 53 can access the data memory 132 connected to the data bus DB. Similarly, as shown in FIG. 12K, the instruction memory 131 connected to the instruction bus IB can access the second Princeton bus PB2 and the DMA controller 53 can access the data memory 132 connected to the data bus DB. Similarly, as shown in FIG. 12L, the first Princeton bus PB1 can access the second Princeton bus PB2 and the DMA controller 53 can access the data memory 132 connected to the data bus DB. Similarly, as shown in FIG. 12M, the instruction memory 131 connected to the instruction bus IB can access the DMA controller 53 and the data memory 132 connected to the data bus DB can access the second Princeton bus PB2.

Similarly, as shown in FIG. 12N, the instruction memory 131 connected to the instruction bus IB can access the DMA controller 53 and the data memory 132 connected to the data bus DB can access the first Princeton bus PB1. Similarly, as shown in FIG. 12O, the instruction memory 131 connected to the instruction bus IB can access the DMA controller 53 and the first Princeton bus PB1 can access the second Princeton bus PB2.

By accessing the buses in this way without any sort of limitation, the buses can be used efficiently and the throughput in the instruction executing section can be greatly improved.

As explained above, as against the conventional microprocessor, in which the CPU must fetch data from the external bus I/F or the like connected to the same Princeton bus after waiting for the completion of an instruction fetch from the program ROM through the instruction bus, the microprocessor of the present invention has the following characteristics. The modules of the program ROM, the program RAM and the like in which instruction accesses are concentrated by the CPU are put together in the first Princeton bus, and the modules of the external bus I/F, the SDRAM I/F, the peripheral bus I/F and the like in which data accesses are mainly concentrated are put together in the second Princeton bus.

Therefore, the instruction access and the data access can be carried out in parallel with respect to the first Princeton bus and the second Princeton bus through the bus control unit. Furthermore, the buses can be used efficiently, so that the throughput of the CPU can be improved substantially.

According to the conventional microprocessor, the DMA controller as a bus master is connected on the bus, and it tends to take longer time for the DMA controller to obtain a bus right for using this bus.

On the contrary, according to the microprocessor of the present invention, the DMA controller is connected directly to the bus control unit 32, thereby to avoid the need for the DMA controller itself to obtain the bus right. Therefore, it has become possible to obtain a bus right promptly. Along with the achievement in the decrease of the load applied to the buses, the parallel processing of the instruction access and the data access as an advantage of the structure of the Harvard architecture has become more effective. It has become possible to further improve the throughput of the CPU by the introduction of the DMA controller.

Further, according to the conventional microprocessor, in order to carry out a stand-by operation, the CPU must carry out a store operation by operating the control register within the clock controller, and as a result, the holding of a clock signal is executed. It has been necessary to prepare a minimum program for test operating the holding of the clock signal.

On the contrary, according to the microprocessor of the present invention, it is possible to input to the bus control unit a stand-by operation request signal for making a stand-by operation active in a test mode, then obtain right for using each of the instruction bus, the data bus, the first Princeton bus, and the second Princeton bus, and thereafter hold a supply of a clock signal to each module. Therefore, unlike the conventional practice, it is easily possible to shift the microprocessor to a stand-by operation without involving the need for the CPU 20 to carry out a store operation at the time of a test operation.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A microprocessor comprising:
   a CPU for executing an instruction;
   an instruction memory for storing instructions;
   a data memory for storing data;
   an instruction bus for making an access to the instruction memory;
   a data bus for making an access to the data memory;
   a first Princeton bus connected with modules for instruction access;
   a second Princeton bus connected with modules for data access; and
   a bus control unit for carrying out a bus arbitration of said instruction bus, said data bus, said first Princeton bus and said second Princeton bus, according to a bus use request from said CPU.

2. The microprocessor according to claim 1, wherein said bus control unit includes separate bus interface sections for said instruction bus, said data bus, said first Princeton bus and said second Princeton bus for carrying out an input/output control of data and addresses, and
   each of said bus interface sections are provided with data buffers for holding data and address buffers for holding addresses.

3. The microprocessor according to claim 1, wherein said bus control unit includes separate bus interface sections for said instruction bus, said data bus, said first Princeton bus and said second Princeton bus, for carrying out an input/output control of data and addresses, and
   each of said bus interface sections are provided with address decoders for decoding the address and outputting an address request signal that shows a connection request destination.

4. The microprocessor according to claim 1, wherein said bus control unit has separate state shift control units for said instruction bus, said data bus, said first Princeton bus and said second Princeton bus, for generating a state signal that shows a using state of a bus according to a control signal output from the modules connected to said instruction bus, said data bus, said first Princeton bus and said second Princeton bus, and
   carries out a bus connection according to a state signal generated by said state shift control units.

5. The microprocessor according to claim 4, wherein said bus control unit has separate wait indication signal generating units for said the instruction bus, said data bus, said first Princeton bus and said second Princeton bus, for outputting a wait indication signal to a module that has issued a bus use request to a bus which is in a bus access state when a state signal generated by said state shift control unit shows the bus access state.

6. The microprocessor according to claim 1, wherein said bus control unit inputs a priority order signal for setting a priority order of buses to be connected, and when there are generated a plurality of connection requests to different buses among said instruction bus, said data bus, said first Princeton bus and said second Princeton bus, then said bus control unit connects the buses according to the priority order set by the priority order signal.

7. The microprocessor according to claim 1, wherein said bus control unit has a DMA interface for carrying out an input/output control of a DMA transfer by connecting thereto a DMA controller for controlling the DMA transfer.

8. The microprocessor according to claim 7, wherein said DMA interface has a data buffer for holding data input and output at the DMA transfer time and an address buffer for holding an address.

9. The microprocessor according to claim 1, wherein said bus control unit inputs a stand-by request signal for requesting a stand-by operation to temporarily stop the operation of a module connected to each bus, then obtains a right of using each bus in each of said bus interfaces, according to the stand-by request signal, and thereafter outputs to each module connected to each bus an operation stop request signal representing a request for interrupting a clock supplied to the modules.

10. The microprocessor according to claim 1, wherein as modules to be connected to the buses, there are connected bus masters for independently generating a bus use request to said bus control unit.

11. A microprocessor comprising:

a CPU for executing an instruction;

an instruction memory for storing instructions;

a data memory for storing data;

an instruction bus for making an access to the instruction memory;

a data bus for making an access to the data memory;

a first common bus connected with modules for instruction access;

a second common bus connected with modules for data access; and a bus control unit connected with said instruction bus, said data bus, said first common bus, and said second common bus, for carrying out a bus arbitration of said instruction bus, said data bus, said first common bus, and said second common bus according to a bus use request from said CPU.

12. The microprocessor according to claim 1, wherein the modules for instruction access are any of program read-only memories (ROM's) or program random-access memories (RAM's).

13. The microprocessor according to claim 1, wherein the modules for data access are any of external bus interface sections or synchronous dynamic random-access -memory (SDRAM) interface sections.

* * * * *